UNITED STATES PATENT OFFICE.

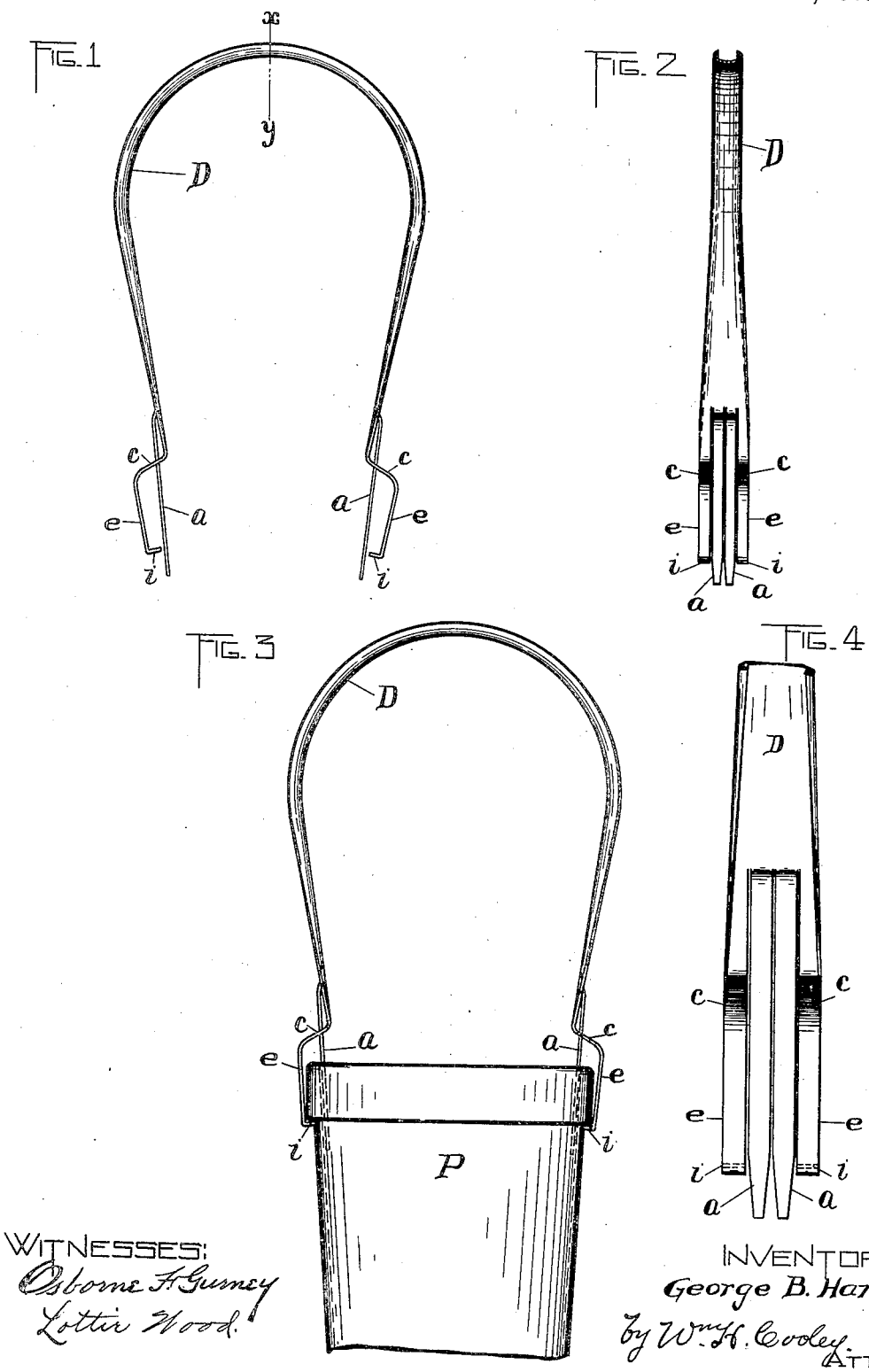

GEORGE B. HART, OF ROCHESTER, NEW YORK.

DETACHABLE BAIL FOR FLOWER-POTS AND LIKE ARTICLES.

No. 912,472.	Specification of Letters Patent.	Patented Feb. 16, 1909.

Application filed August 2, 1907. Serial No. 386,769.

*To all whom it may concern:*

Be it known that I, GEORGE B. HART, a citizen of the United States, and a resident of Rochester, in the county of Monroe and State of New York, have invented a new and Improved Detachable Bail for Flower-Pots and Like Articles, of which the following is a specification.

The object of my invention is to provide a cheap and efficient bail for flower pots and like articles and one which may be readily attached thereto or detached therefrom.

My invention comprises a strip of metal, preferably steel, sufficiently hard to have a strong tendency to retain the conformation which is given thereto in the formation of my bail, and such strip of steel is divided at each end, preferably into four prongs, and conformed to engage the flower pot, while the body of the bail between such ends is curved transversely to form a more satisfactory conformation for engagement by the hand.

Around flower pots and like articles such as are designed to be supported and carried by my bail and near the top thereof there is usually provided a rim consisting in a thickened portion of the side wall and with the projection formed by such thickened portion extending outwardly from the outside of the main portion of the wall, and for engaging under such rim, the ends of, preferably two, of such prongs at each end of the bail are formed up into hooks, while the other two of such prongs are adapted to extend downwardly on the inside of the flower pot and against the wall thereof. The prongs carrying the hooks for engaging under the rim are formed to cause them to engage more firmly as the weight on the bail increases within the moderate range for which the bail is made.

The accompanying drawings illustrating my invention are as follows:—

Figure 1 is a side view of my bail and Fig. 2 is a sectional view taken along the line $x$—$y$ of Fig. 1 with all parts to the right of such line removed. Fig. 3 is a side view of my bail seen in operative position and attached to a flower pot. Fig. 4 is an enlarged view of the lower end of the bail detached and as seen from the right in Figs. 1 and 3.

Similar letters refer to similar parts throughout the several figures of drawing.

Referring to the drawings,—my bail is formed from a strip of metal curved transversely, as indicated at D in Figs. 1 and 2, to form an appropriate handle portion. The curvature in the strip gradually decreases towards each end thereof, beginning approximately at the base of the semi-circular handle portion thereof. It is preferable, however, that, as shown in the drawings, the transverse curvature of the handle portion B be extended downwardly so as to terminate at the uppermost bends in the outer prongs $c$ for the purpose of stiffening such prongs above such bends therein. Each end of the strip of metal is divided, preferably, into four prongs, the two inner ones of which $a$ $a$ are first bent slightly outwards and then extended downwardly so as to engage within the inside of the flower pot and against the wall thereof, while the outer prongs $e$ $e$ are bent, at a point approximating the termination of the curved edges thereof, slightly downwards and outwardly, as seen at $c$ $c$, and then again bent downwardly in convergent directions and have their lower ends terminating in the hooks $i$ $i$ adapted to engage under the rim of the flower pot.

On account of the curvature at the outer edges of the outer prongs at their upper ends, there is a stronger tendency to oppose a change of the angle between the portions $c$ $c$ thereof and the main body of the handle, while any tendency of the prongs $e$ $e$ to straighten out at the curve between the parts $c$ $c$ and $e$ $e$ results in forcing the hooks $i$ $i$ more firmly into engagement with the under edge of the rim on the flower pot P.

The inner prongs $a$ $a$ engaging on the inside of the flower pot P prevent a spreading of the inside portions of the bail.

In attaching the bail, the prongs $a$ $a$ at each end of the handle or bail D are brought against the inside of the flower pot or like article and the members $e$ $e$ are sprung outwardly and each end of the handle is forced down so that the hooks $i$ $i$ engage on the outside of the flower pot and then the handle or bail may be forced down until the parts assume the final and operative positions, indicated in Fig. 3.

What I claim is:—

1. A detachable bail for flower pots and like articles formed from a strip of suitable material and divided at its ends by longitudinally extending slits into a plurality of prongs, one or more of such prongs at each end of such bail adapted to extend downwardly on the inside of the side wall of the vessel and one or more of the remaining prongs at each end of the bail hooked and adapted to extend downwardly on the outside of and engage under a rim or projection on the outside of the wall of such vessel, each of the prongs adapted to engage on the outside of the vessel having one of its edges curved transversely of the prong throughout a portion of its length.

2. A detachable bail for flower pots and like articles formed from a strip of suitable material and divided at its ends by longitudinally extending slits into a plurality of prongs, one or more of such prongs at each end of such bail adapted to extend downwardly on the inside of the side wall of the vessel and one or more of the remaining prongs at each end of the bail hooked and adapted to extend downwardly on the outside of and engage under a rim or projection on the outside of the wall of such vessel, each of the prongs adapted to engage on the outside of the vessel having one of its edges curved transversely of the prong throughout a portion of its length to stiffen the same and such prongs below such stiffened portion flexibly supported from the main body portion of the handle at points within the points of engagement with the rim on the vessel by the hooks on the lower ends of such prongs.

3. A detachable bail for flower pots and like articles comprising a central handle portion and integrally formed therewith at each end a prong having a hook adapted to engage under the rim on the outside of the vessel, such prongs extending first upwardly from such hooks and then inwardly to the main body portion of the bail and joined thereto at points within the points of engagement of such hooks with the rim on the vessel, the bail rendered flexible at the points of union of the prongs therewith by the conformation and coöperation of the parts, whereby such prongs, under the weight of the vessel and contents supported from the bail, are sprung inwardly causing the hooks thereon to engage more forcibly against the vessel.

GEORGE B. HART.

Witnesses:
LOTTIE WOOD,
OSBORNE F. GURNEY.